US011811685B1

(12) United States Patent
K N et al.

(10) Patent No.: US 11,811,685 B1
(45) Date of Patent: *Nov. 7, 2023

(54) SELECTIVE PACKET PROCESSING INCLUDING A RUN-TO-COMPLETION PACKET PROCESSING DATA PLANE

(71) Applicant: Juniper Networks, Inc., Sunnyvale, CA (US)

(72) Inventors: Kiran K N, Bangalore (IN); Przemyslaw Krzysztof Grygiel, Gniezno (PL); Damian Szeluga, Vienna (AT)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,226

(22) Filed: Jul. 18, 2022

Related U.S. Application Data

(63) Continuation of application No. 17/301,367, filed on Mar. 31, 2021, now Pat. No. 11,394,663.

(51) Int. Cl.
*H04L 49/00* (2022.01)
*H04L 47/625* (2022.01)
*H04L 47/56* (2022.01)

(52) U.S. Cl.
CPC .......... *H04L 49/3063* (2013.01); *H04L 47/56* (2013.01); *H04L 47/6255* (2013.01)

(58) Field of Classification Search
None
See application file for complete search history.

(56) References Cited

U.S. PATENT DOCUMENTS

| 10,291,497 | B2 | 5/2019 | Mehta et al. |
| 11,394,663 | B1* | 7/2022 | K N ................... H04L 47/6255 |
| 2015/0110132 | A1 | 4/2015 | Purushothaman et al. |
| 2017/0061041 | A1 | 3/2017 | Kumar et al. |
| 2018/0275891 | A1 | 9/2018 | Jin et al. |
| 2020/0097269 | A1 | 3/2020 | Wang et al. |
| 2021/0136049 | A1 | 5/2021 | Wang et al. |
| 2022/0021687 | A1 | 1/2022 | Bhattacharya et al. |

FOREIGN PATENT DOCUMENTS

WO    2013/184846 A1    12/2013

OTHER PUBLICATIONS

Hopps, "Analysis of an Equal-Cost Multi-Path Algorithm," Network Working Group, RFC 2992, Nov. 2000, 9 pp.
Notice of Allowance from U.S. Appl. No. 17/301,367, dated Mar. 4, 2022, 8 pp.

* cited by examiner

*Primary Examiner* — Diane L Lo
(74) *Attorney, Agent, or Firm* — Shumaker & Sieffert, P.A.

(57) ABSTRACT

An example virtual router includes a plurality of logical cores ("lcores"), where each lcore comprises a CPU core or hardware thread. The virtual router is configured to determine a latency profile, select, based at least in part on the latency profile, a packet processing mode from the plurality of packet processing modes. In response to a determination that the packet processing mode comprises the run-to-completion mode, an lcore of the plurality of lcores is configured to: read a network packet from a device queue, process the network packet to determine a destination virtual device for the network packet, the destination virtual device having a plurality of interface queues, and insert the network packet into an interface queue of the plurality of interface queues.

20 Claims, 5 Drawing Sheets

SELECTIVE PACKET PROCESSING INCLUDING A RUN-TO-COMPLETION PACKET PROCESSING DATA PLANE

This application is a continuation of U.S. patent application Ser. No. 17/301,367, filed 31 Mar. 2021, the entire contents of which is incorporated herein by reference.

TECHNICAL FIELD

The disclosure relates to computer networks and, more particularly, to packet processing in computer networks.

BACKGROUND

In a typical cloud data center environment, a large collection of interconnected servers provides computing (e.g., compute nodes) and/or storage capacity to run various applications. For example, a data center comprises a facility or set of facilities that host applications and services for customers of the data center. The data center, for example, hosts all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Software Defined Networking (SDN) platforms may be used in data centers, and in some cases, may use a logically centralized and physically distributed SDN controller, and a distributed forwarding plane of virtual routers that extend the network from physical routers and switches in the data center into a virtual overlay network hosted in virtualized servers. The SDN controller provides management, control, and analytics functions of a virtualized network and orchestrates the virtual routers by communicating with the virtual routers. The virtual routers operate on the servers to forward packets between the applications and the overlay network.

SUMMARY

In general, the disclosure describes techniques for lowering packet latency in computer networks by performing run-to-completion processing on packets. In general, latency is the amount of time taken by forwarding logic to process a packet. Latency can be an important metric in determining the performance of a data plane in a computer network. It is generally desirable to have as low latency as possible for many applications. In a software-based virtual router, latency may be introduced in packet processing software due to internal queueing and processing the packet using table lookups, header manipulation, adding/deleting headers, rewriting header fields etc. Low latency can be a crucial need for some applications. For example, Voice over Internet Protocol (VOIP) and fifth generation (5G) telephony applications are typically not tolerant of large latency or jitter that may be introduced by long packet processing times.

The techniques described herein provide for a run-to-completion mode of operation for a virtual router having multiple software processes that operate on programmable execution hardware that include a plurality of different CPU cores, referred to herein generally as processors. The virtual router may operate on a network of physical network devices and virtual network devices. The virtual network devices may be software or other logic that implements the features of a corresponding physical device. For example, a virtual router may implement in software the features of a physical router. A virtual network device may have a virtual network interface. The virtual network interface may provide the same functionality to the virtual device as a physical network interface provides to a physical network device. In some aspects, a virtual router operating on the programmable execution hardware may be configured for both run-to-completion and pipeline modes of operation. In the run-to-completion mode described herein, the same processor that dequeues an inbound network packet from a device queue associated with a physical network interface may be used to processes the network packet to determine a destination virtual device (e.g., a virtual network interface or the virtual device), and enqueues the network packet onto an interface queue associated with the virtual device. In a pipeline mode of the virtual router, a first software process (thread) executing on a first processor may dequeue the network packet from the device queue and enqueue the packet onto an internal queue. A second process executing on a different processor may dequeue the packet from the internal queue, process the packet, and enqueue the packet onto an interface queue of the virtual device. An operating system (e.g., kernel) providing the operating environment for the virtual router may perform context switches in order to schedule the first process and second process of the virtual router. Further, there are additional dequeuing and enqueuing operations performed by pipeline processing when compared to run-to-completion processing. Context switching and additional queuing operations typically add latency in packet processing. The additional latency may render the network system unsuitable for certain types of applications. For example, the additional latency may render the network system unsuitable for 5G and VOIP applications, among others.

A practical application of the techniques described herein is a virtual router in a network system that implements the techniques to provide a run-to-completion mode of operation. The techniques for run-to-completion mode described herein can provide technical advantages. For example, the techniques described herein avoid context switches and extra dequeuing enqueuing operations and can thus provide lower latency packet processing when compared to pipeline processing. Thus, a network system having virtual routers that implement a run-to-completion mode of operation may be suitable for 5G and VOIP applications that may be sensitive to large latency times (e.g., latencies in excess of 150 μs).

An example system includes a plurality of logical cores ("lcores"), each of the lcores comprising a CPU core or hardware thread; a physical network interface configured to receive network packets and distribute the received network packets across a plurality of device queues; and a virtual router executable by the plurality of lcores, the virtual router implementing a plurality of packet processing modes, the packet processing modes including a pipeline mode and a run-to-completion mode, the virtual router configured to: determine a latency profile, select, based at least in part on the latency profile, a packet processing mode from the plurality of packet processing modes, in response a determination that the packet processing mode comprises the run-to-completion mode, an lcore of the plurality of lcores is configured to: read a network packet from a device queue, process the network packet to determine a destination virtual device for the network packet, the destination virtual device having a plurality of interface queues, and insert the network packet into an interface queue of the plurality of interface queues.

An example virtual router includes a plurality of logical cores ("lcores"), each of the lcores comprising a CPU core or hardware thread; wherein a first lcore of the plurality of lcores is configured to: determine a latency profile, select, based at least in part on the latency profile, a packet processing mode from the plurality of packet processing modes, in response to a determination that the packet processing mode comprises the run-to-completion mode, a second lcore of the plurality of lcores is configured to: read a network packet from a device queue of a physical network interface, process the network packet to determine a destination virtual device for the network packet, the destination virtual device having a plurality of interface queues, and insert the network packet into an interface queue of the plurality of interface queues.

An example method includes instantiating a virtual router, the virtual router executable by a plurality of lcores, each of the lcores comprising a CPU core or hardware thread; determining, by a first lcore of the plurality of lcores, a latency profile; selecting, by the first lcore based at least in part on the latency profile, a packet processing mode from the plurality of packet processing modes; in response to determining that the packet processing mode comprises the run-to-completion mode: reading, by a second lcore, a network packet from a device queue of a physical network interface, processing, by the second lcore, the network packet to determine a destination virtual device for the network packet, the destination virtual device having a plurality of interface queues, and inserting the network packet into an interface queue of the plurality of interface queues.

The details of one or more examples are set forth in the accompanying drawings and the description below. Other features, objects, and advantages will be apparent from the description and drawings, and from the claims.

DETAILED DESCRIPTION

Figure 1:
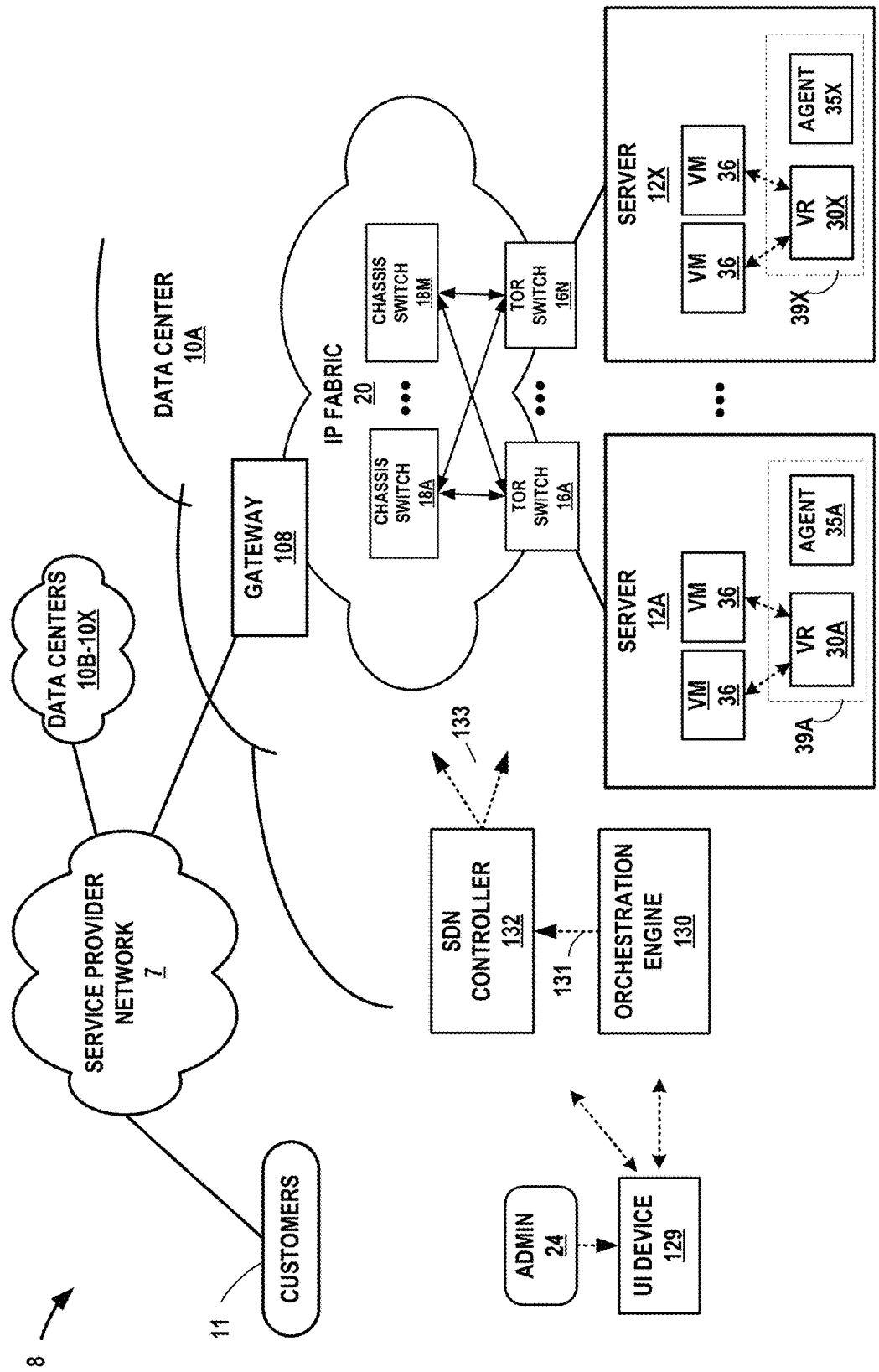
FIG. 1 is a block diagram illustrating an example computer network system in accordance with techniques described herein.

FIG. 1 is a block diagram illustrating an example computer network system 8 in accordance with techniques described herein. The example computer network system 8 can be configured and operated using the techniques described below with respect to FIGS. 2A-2C and 3.

Computer network system 8 in the example of FIG. 1 includes data centers 10A-10X (collectively, "data centers 10") interconnected with one another and with customer networks associated with customers 11 via a service provider network 7. FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for customers 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers, and may thus form part of a large-scale public network infrastructure, e.g., the Internet. In some examples, data center 10A may represent one of many geographically distributed network data centers. As illustrated in the example of FIG. 1, data center 10A is a facility that provides network services for customers 11. Customers 11 may be collective entities such as enterprises and governments or individuals. For example, a network data center may host web services for several enterprises and end users. Other example services may include data storage, virtual private networks, traffic engineering, file service, data mining, scientific, or super-computing, and so on. In some examples, data center 10A is an individual network server, a network peer, or otherwise.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more application workloads. As described herein, the terms "application workloads" or "workloads" may be used interchangeably to refer to application workloads. Workloads may execute on a virtualized environment, such as a virtual machine 36, a container, or some of type of virtualized instance, or in some cases on a bare metal server that executes the workloads directly rather than indirectly in a virtualized environment. Each of servers 12 may be alternatively referred to as a host computing device or, more simply, as a host. A server 12 may execute one or more of workloads 37 on one or more virtualized instances, such as virtual machines 36, containers, or other virtual execution environment for running one or more services (such as virtualized network functions (VNFs)). Some or all of the servers 12 can be bare metal servers (BMS). A BMS can be a physical server that is dedicated to a specific customer or tenant.

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected top-of-rack (TOR) switches 16A-16N (collectively, "TOR switches 16") coupled to the distribution layer of chassis switches 18A-18M (collectively, "chassis switches 18"). In some examples, chassis switches 18 may operate as spine nodes and TOR switches 16 may operate as leaf nodes in data center 10A. Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and customers 11 by service provider network 7.

Switch fabric 20 may perform layer 3 routing to route network traffic between data center 10A and customers 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via a northbound API 131, which in turn operates in response to configuration input received from an administrator 24 operating user interface device 129. In some aspects, the SDN controller 132 may be part of a high availability (HA) cluster and provide HA cluster configuration services. Additional information regarding SDN controller 132 operating in conjunction with other devices of data center 10A or other software-defined networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers 30 that extend the network from physical routers and switches in the data center switch fabric into a virtual overlay network hosted in virtualized servers.

In some examples, SDN controller 132 manages the network and networking services such load balancing, security, network configuration, and allocation of resources from servers 12 to various applications via southbound API 133. That is, southbound API 133 represents a set of communication protocols utilized by SDN controller 132 to make the actual state of the network equal to the desired state as specified by orchestration engine 130. One such communication protocol may include a messaging communications protocol such as XMPP, for example. For example, SDN controller 132 implements high-level requests from orchestration engine 130 by configuring physical switches, e.g., TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual routers (VRs) 30A-30X or agents 35A-35X ("AGENT" in FIG. 1) on each of servers 12A-12X.

As described herein, each of servers 12 include a respective forwarding component 39A-39X (hereinafter, "forwarding components 39) that performs data forwarding and traffic statistics collection functions for workloads executing on each server 12. In the example of FIG. 1, each forwarding component is described as including a virtual router ("VR 30A—VR 30X" in FIG. 1) to perform packet routing and overlay functions, and a VR agent ("VA 35A-35X" in FIG. 1) to communicate with SDN controller 132 and, in response, configure the virtual routers 30.

In this example, each virtual router 30A-30X implements at least one routing instance for corresponding virtual networks within data center 10A and routes the packets to appropriate virtual machines, containers, or other workloads executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like BGP. In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant within data center 10A or across data centers. Orchestration engine 130 may attach workloads (WLs) to a tenant's virtual network. Orchestration engine 130 may connect a tenant's virtual network to an external network, e.g., the Internet or a VPN. Orchestration engine 130 may implement a security policy across a group of workloads or to the boundary of a tenant's network. Orchestration engine 130 may deploy a network service (e.g., a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g., TOR switches 16, chassis switches 18, and switch fabric 20; physical routers; physical service nodes such as firewalls and load balancers; and virtual services such as virtual firewalls in a virtual machine (VM). SDN controller 132 maintains routing, networking, and configuration information within a state database.

Typically, the traffic between any two network devices, such as between network devices (not shown) within switch fabric 20 or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular traffic flow over a single deterministic path.

Virtual routers (virtual router 30A to virtual router 30X, collectively "virtual routers 30" in FIG. 1) execute multiple routing instances for corresponding virtual networks within data center 10A and routes the packets to appropriate workload executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier. One or more of the virtual routers 30 shown in FIG. 1 may implement techniques described herein to perform run-to-completion operations.

Figure 2A:
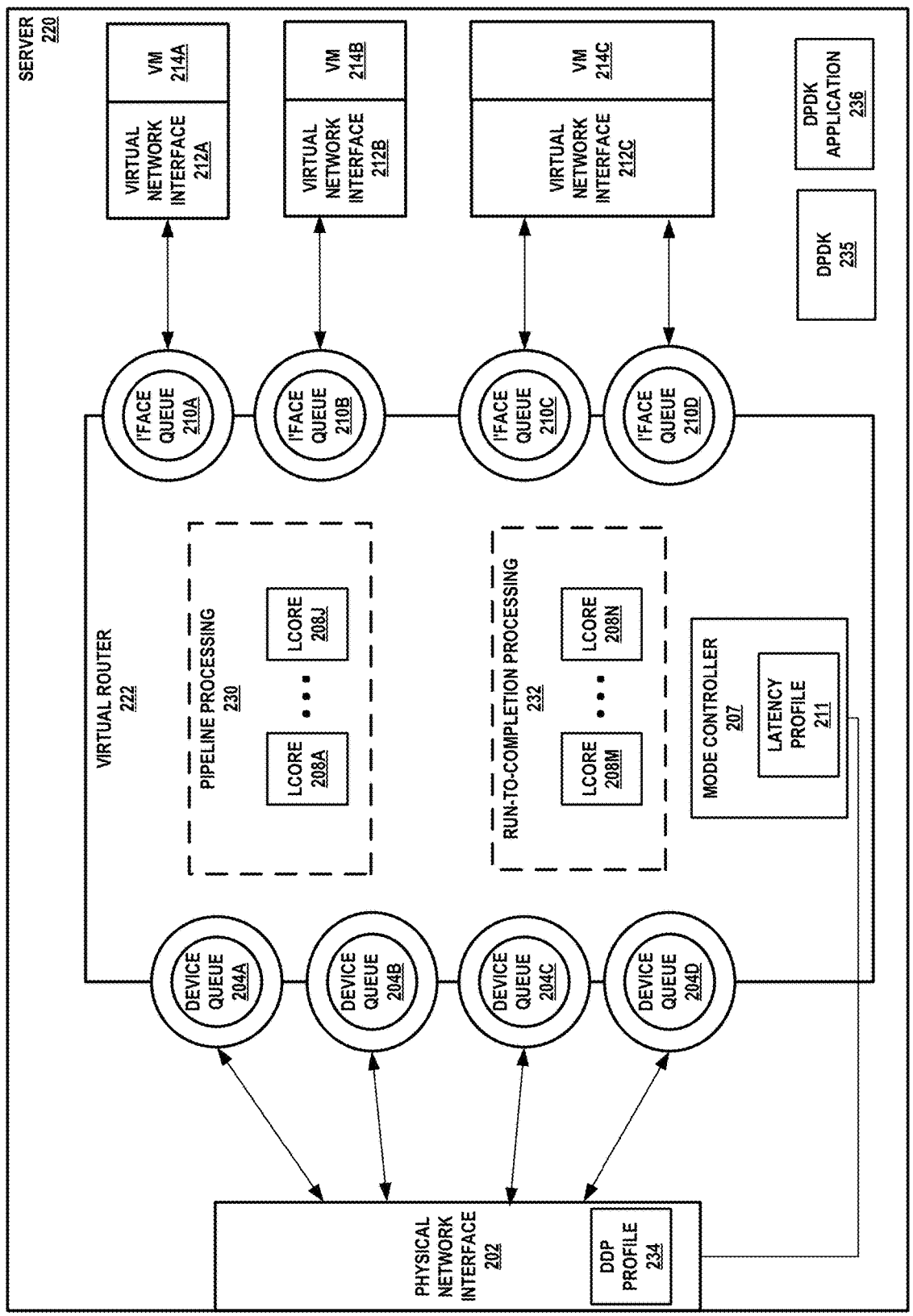
FIGS. 2A-2C are block diagrams illustrating example implementations of virtual routers of FIG. 1 in further detail and in accordance with techniques described herein.
Figure 2B:
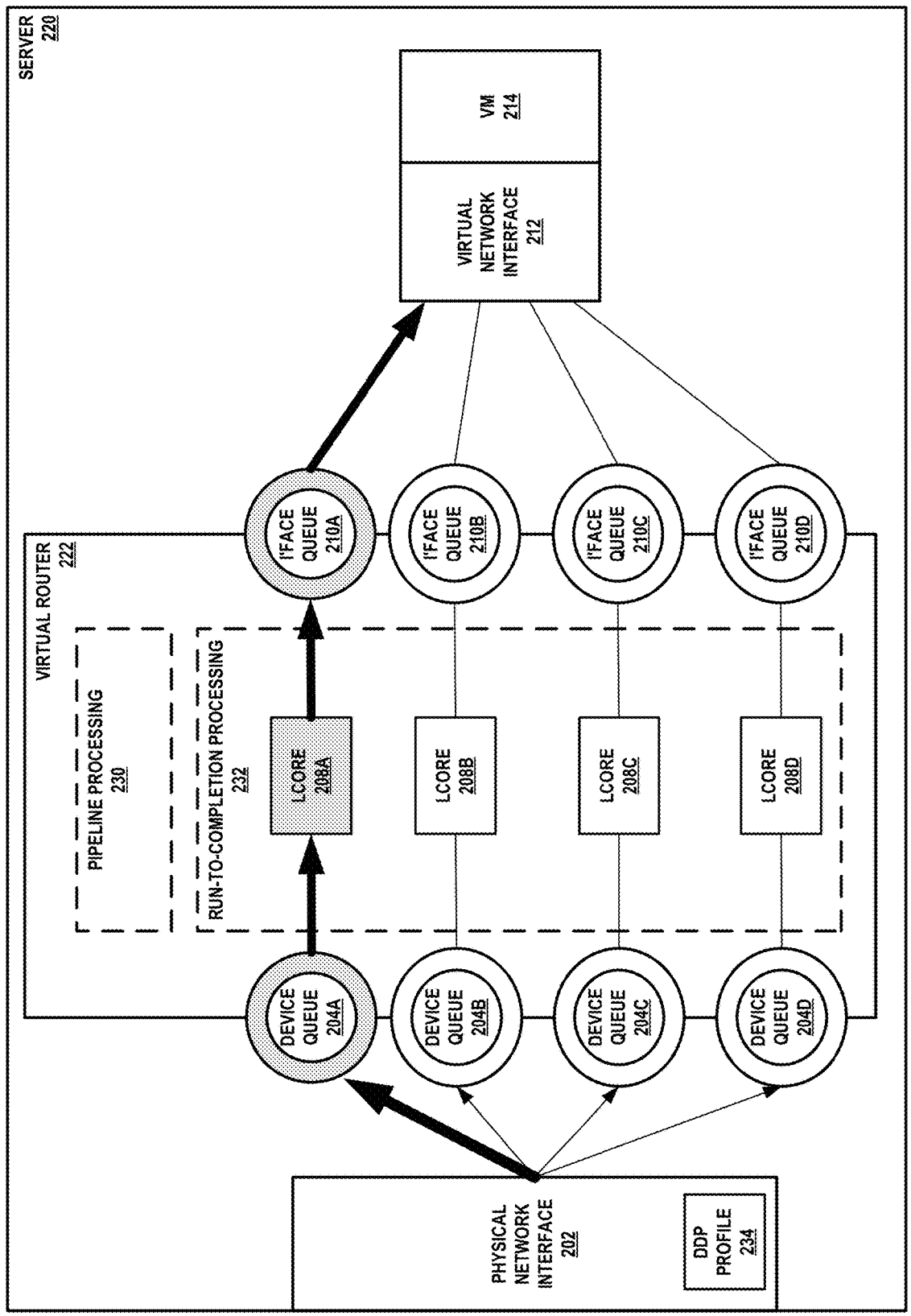
Figure 2C:
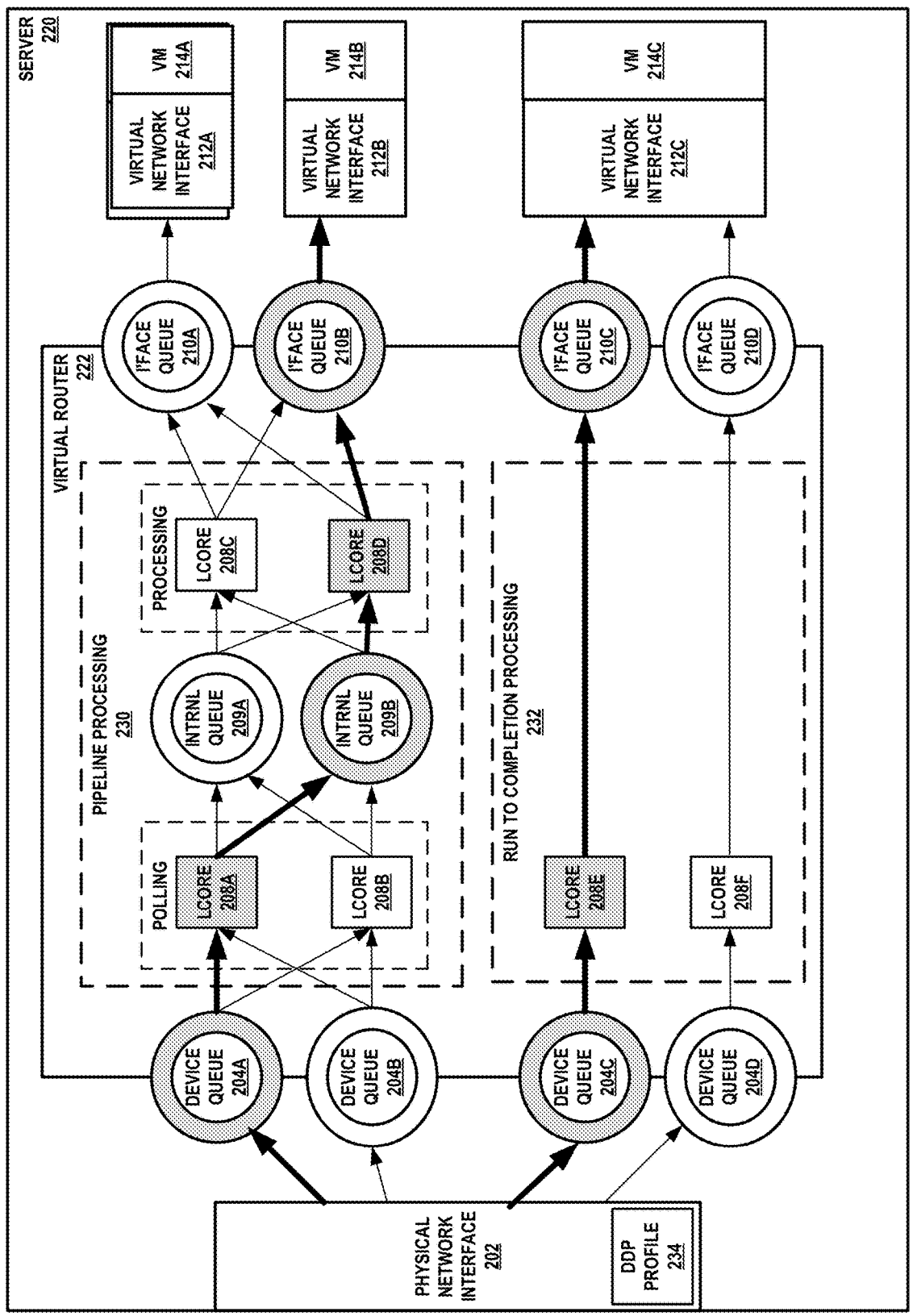

FIGS. 2A-2C are block diagrams illustrating example implementations of virtual routers 30 of FIG. 1 in further detail and in accordance with techniques described herein. The examples illustrated in FIGS. 2A-2C illustrate various aspects of run-to-completion operations and pipeline operations in a virtual router 222 of a server 220. Virtual router 222 may use techniques described below to select the packet processing mode to utilize when processing a network packet. In some aspects, server 220 can be one or more of servers 12A-12X (FIG. 1) and virtual router 222 can be one or more of virtual routers 30A-30X. Virtual machines 214A-214B (generically, "virtual machine 214") can be virtual machines 36 (FIG. 1).

FIG. 2A is a block diagram illustrating a virtual router that can be configured to dynamically select a packet processing mode for network packets. In the example illustrated in FIG. 2A, server 220 can include virtual router 222, physical network interface 202, and virtual machines 214. Server 220 may be part of an SDN. An SDN typically includes control plane components and data plane components. Data plane components include components that forward network packets from one interface to another. Control plane components can be components that determine which path to use in forwarding a network packet. For example, routing protocols (such as OSPF, ISIS, EIGRP, MPLS etc.) are control plane protocols. In some aspects, server 220 includes a Data Plane Development Kit (DPDK) 235. DPDK 235 provides a set of data plane libraries and network interface controllers that offload drivers for network packet processing from an operating system kernel to processes running in user space. Thus, in some aspects, virtual routers 222 may incorporate DPDK 235 components and may operate in user space along with virtual machines 214. DPDK 235 provides a polling mode for polling a network interface for network packets that can be more efficient and provide higher throughput than the interrupt-driven processing typically provided by network device drivers in an operating system kernel.

Server 220 has multiple CPU cores. Each of the CPU cores may be capable of running two or more threads simultaneously (e.g., a "hyperthreaded" CPU core). The CPU cores of server 220 may correspond to logical cores 208A-208N (generically referred to as "lcore 208"). An lcore 208 can be a logical execution unit that can be an abstraction representing a physical CPU core or hardware thread of a CPU core. Thus, the term "lcore" can refer to a CPU core or hardware thread of server 220. An lcore 208 may be bound to a particular CPU core or configured to have an affinity for a CPU core or set of CPU cores of server 220.

Virtual machines 214 may implement virtual routers, VNFs, etc. A virtual machine can have a virtual network interface card (VNIC) 212. VNIC 212 can be a software or implementation of the functions of a physical network interface card that a corresponding virtual machine 214 uses to send and receive network packets. In some aspects, a VNIC 212 may implement a single interface queue 210. In the example illustrated in FIG. 2A, VNIC 212A and VNIC 212B each implement a single interface queue 210A and 210B, respectively. In some aspects, a VNIC 212 may implement multiple interface queues 210. In the example illustrated in FIG. 2A, VNIC 212C implements two interface queues 210C and 210D.

Physical network interface 202 may be a network interface card (NIC), line card, physical port etc. Physical network interface 202 can send and receive network packets to and from other network interfaces. Physical network interface 202 can be a wired network interface or a wireless network interface. Physical network interface 202 places received network packets on one of device queues 204A-204D (generically referred to as "device queue 204"). Device queue 204 can be a First-Out (FIFO) queue (also referred to as a "ring buffer"). Physical network interface 202 may load balance network packets by distributing incoming network packets across device queues 204A-204D. In some aspects, physical network interface 202 hashes packet header information of a network packet to determine a device queue 204 to receive the network packet. For example, physical network interface 202 may perform receive side scaling (RSS) hashing on a 5-tuple comprising the source address, source port, destination address, destination port, and protocol identifier included in a header of a network packet. RSS hashing can perform load balancing by randomly distributing network packets to device queues 204A-204D according to the results of the hashing function.

In some aspects, physical network interface 202 may hash certain header fields of incoming network packets in order to load balance distribution of network packets across device queues 204A-204D. For example, physical network interface 202 may perform RSS hashing on header fields of incoming network packets. RSS hashing can be desirable when the networking protocol in use has header fields whose data can provide sufficient entropy such that the hashing algorithm in use by physical network interface 202 can produce output useful for load balancing (e.g., a relatively even distribution of packets across the device queues 204A-204D). For example, Multiprotocol Label Switching over User Datagram Protocol (MPLSoUDP) and Virtual Extensible Local Area Network (VxLAN) packets have packet headers that include data fields that can be used to form a 5-tuple comprising source IP address, source port, destination IP address, destination port, and protocol. This 5-tuple has reasonable entropy allowing the 5-tuple to be the basis for physical network interface 202 to perform load distribution using RSS hashing.

Other protocols, such as MPLS over Generic Routing Encapsulation (MPLSoGRE), may have headers that do not include a protocol field. Tuples formed using MPLSoGRE header information may have less entropy with respect to hashing algorithms and thus hashing may not be a suitable mechanism for load balancing. In some aspects, physical network interface 202 can support the use of a Dynamic Device Personalization (DDP) profile 234. A DDP profile can be used to specify filters that physical network interface 202 applies to an incoming network packets to determine a device queue 204 to receive the network packet. Physical network interface 202 can use such filters to load balance incoming network packets across device queues 204A-204D.

In the example illustrated in FIG. 2A, DPDK application 236 can initialize (e.g., instantiate) virtual machine 214 and virtual router 222 in a user space memory portion of server 220. Once initialized, virtual router 222 can begin processing network packets. In some aspects, virtual router 222 can process network packets using run-to-completion operations 232 or pipeline operations 230 based on a packet processing mode. Run-to-completion operations 232 and pipeline operations 230 both enqueue and dequeue network packets to and from device queues 204 and interface queues 210. In run-to-completion mode, run-to-completion operations 232 are performed by a single lcore 208 (e.g., one of lcores 208M-208N in the example shown in FIG. 2A). That is, the same lcore 208 that dequeues a network packet from device queue 204 also processes the packet to determine a destination for the packet and enqueues the network packet onto a destination interface queue 210. In pipeline processing 230, different lcores 208A-208J process a network packet as it passes through virtual router 222. Further details on run-to-completion processing 232 and pipeline processing are provided below with respect to FIGS. 2B and 2C.

Mode controller 207 of virtual router 222 can determine the packet processing mode to use for processing network packets. In some aspects, mode controller 207 determines a latency profile 211 that can be used to select the packet processing mode. Latency profile 211 can include various characteristics of physical network interfaces 202, characteristics of virtual network interfaces 212, and characteristics of the network packet.

Characteristics of the network packet that may be used by mode controller 207 to determine latency profile 211 can include the network protocol used to transport the network packet. As noted above, MPLSoUDP and VxLAN packets have packet headers that can be hashed to determine a destination device queue 204 to receive the network packet. The packet headers used by the hashing algorithm (e.g., RSS hashing) on such packet headers have sufficient entropy to ensure that network packets are efficiently load balanced across device queues 204. However, other protocols, such as MPLSoGRE have header fields where hashing does not produce an efficient load balance across device queues 204 because the resulting hash values tend to direct network packets to the same device queue.

Characteristics of physical network interface 202 that may be used by mode controller 207 to determine latency profile 211 can include whether or not physical network interface 202 supports multiqueue (e.g., physical network interface 202 provides multiple device queues 204 for sending and receiving network packets). If physical network interface 202 does not support multiqueue, then mode controller 207 may set the packet processing mode to pipeline processing for the network packet.

A further characteristic of physical network interface that can be used by mode controller 207 to determine latency profile 211 includes whether or not physical network interface 202 is configured with a DDP profile 234. Mode controller 207 can use information in DDP profile 234 to determine if physical network interface 202 can efficiently load balance network packets across device queues 204. For example, as noted above hashing the header fields of MPLSoGRE is not typically useful in efficiently load balancing network packets across device queues 204. However, DDP profile 234 can configure physical network interface 202 with a packet filter that can apply heuristics to MPLSoGRE network packets that can load balance the network packets across device queues 204.

Characteristics of virtual network interface 212 that may be used by mode controller 207 to determine latency profile 211 can include whether or not virtual network interface 212 supports multiqueue (e.g., virtual network interface 212 provides multiple interface queues 210 for sending and receiving network packets). If a virtual network interface 212 does not support multiqueue, mode controller 207 can determine that the packet processing mode is the pipeline mode.

Mode controller 207 can use any or all of the aforementioned characteristics to determine latency profile 211. If latency profile 211 indicates that network packets received by physical network interface 202 can be efficiently load balanced across device queues 204, mode controller 207 can set the packet processing mode to run-to-completion mode indicating that virtual router 222 is to perform run-to-completion processing 232 on the network packets. If latency profile 211 indicates that packets cannot be efficiently load balanced across device queues 204, mode controller 207 can set the packet processing mode to pipeline mode indicating that virtual router 222 is to perform pipeline processing 230 on the network packets.

Additionally, physical network interface 202 may perform run-to-completion processing 232 if configuration data indicates such processing is to be performed. In some aspects, the configuration data may indicate that the virtual router should be configured to perform pipeline processing only, run-to-completion processing only, or a hybrid of both pipeline and run-to-completion processing. Virtual router 222 may use various combinations of some or all of the above-mentioned criteria to determine that run-to-completion processing 232 is to be performed with respect to network packets.

In some aspects, virtual router 222 may dynamically change packet processing modes. For example, virtual router 222 may query physical network interface 202 to determine if physical network interface 202 has been efficiently load balancing incoming network packets. If the physical network interface has been efficiently load balancing incoming network packets, virtual router 222 may set the packet processing mode to run-to-completion mode if the packet processing mode is not currently set to run-to-completion. Similarly, if the physical network interface has not been efficiently load balancing incoming network packets, virtual router 222 may set the packet processing mode to pipeline mode (if not already set to pipeline mode).

FIG. 2B illustrates further details of run-to-completion processing 232. In the example illustrated in FIG. 2B, virtual router 222 executes on four lcores 208A-208D. For example, a different instance of a packet processing thread of virtual router 222 may execute on each of the four lcores 208A-208D. Each of lcores 208A-208D is assigned to process a corresponding device queue 204A-204D respectively. For example, a packet processing thread of virtual router 222 may execute on an lcore 208 and may be assigned to a specific one of device queues 204A-204D. In some aspects, an lcore 208 may poll its assigned device queue 204 to determine if any network packets are available for processing by the lcore 208.

When a network packet becomes available on a device queue 204, the lcore 208 assigned to the device queue removes (i.e., dequeues) the network packet from the device queue 204 and processes the network packet to determine a destination for the network packet. In the example illustrated in FIG. 2B, lcore 208A has dequeued an available network packet from its assigned device queue 204A and determined that the destination for the network packet is virtual machine 214. Lcore 208A inserts (i.e., enqueues) the network packet onto an interface queue 210 of virtual network interface 212 of virtual machine 214. In some aspects, an interface queue 210 is assigned to a particular lcore 208. For example, a packet processing thread of virtual router 222 executing on an lcore 208 may be assigned to a specific one of interface queues 210A-210D. An interface queue 210 assigned to an lcore 208 may not be assigned to other lcores. In some aspects, an interface queue can be a virtio ring shared by the virtual router 222 and virtual network interface 212. In the example illustrated in FIG. 2B, interface queue 210A is assigned to lcore 208A and interface queues 210B-210D are assigned to lcores 208B-208D.

The above-described processing can be referred to as "run-to-completion" processing because once a network packet has been dequeued from a device queue 204, the same lcore 208 processes the packet until it is delivered to an interface queue 210 of a destination device. Further, as discussed above, in some aspects a device queue 204 is assigned to a single lcore 208. A device queue 204 assigned to an lcore 208 is not assigned to any other lcores 208. Similarly, an interface queue 210 may be assigned to a single lcore 208. An interface queue 210 assigned to an lcore 208 is not assigned to any other lcores 208. In the example illustrated in FIG. 2B, lcores 208A-208D are assigned respectively to device queues 204A-204D and interface queues 210A-210D.

FIG. 2C illustrates a virtual router 222 that is configured for both pipeline processing 230 and run-to-completion processing 232. For example, virtual router 222 may be configured to determine a packet processing mode for packets arriving via physical network interface 202. The packet processing mode can include a run-to-completion mode and a pipeline mode. Upon determining that an arriving network packet is to be processed in pipeline mode, virtual router 222 is configured to perform pipeline processing 230 of the network packet. In such pipeline processing 230, an lcore 208 (also referred to as a "polling lcore") can remove (dequeue) available network packets from device queues 204. In some aspects, a polling lcore 208 polls device queues 204 for the presence of network packets to be dequeued. In the example illustrated in FIG. 2C, either or both polling lcores 208A and 208B can poll either or both device queues 204A and 204B. In some aspects, software locking mechanisms may be used to prevent two lcores from attempting to access a device queue 204 at the same time. Such locking mechanisms can introduce processing overhead when processing network packets in pipeline mode. In the example illustrated in FIG. 2C, polling lcore 208A has determined that a network packet is available on device queue 204A. Lcore 208A dequeues the available network packet from device queue 204A.

A polling lcore 208 that removes a network packet from a device queue may place the dequeued network packet on an internal queue 209 for subsequent processing by a different lcore 208 (referred to as a processing lcore). In some aspects, a processing lcore 208 may attempt to load balance placement of network packets onto queues 209. As with device queues 204, software locking mechanisms may be used to prevent more than one lcore from attempting to access an internal queue 209 at the same time. In the example illustrated in FIG. 2C, lcore 208A inserts (enqueues) the network packet removed from device queue 204A onto internal queue 209B.

A processing lcore 208 removes an available network packet from one of queues 209 and determines a network destination for the dequeued network packet. After determining the destination of the network packet, the processing lcore 208 places the processed packet on an interface queue 210 of a network interface 212 of the destination device. In the example illustrated in FIG. 2C, processing lcore 208D dequeues the network packet from internal queue 209B and processes the network packet. In this example, lcore 208D determines that virtual machine 214B is the destination for the network packet. Lcore 208D places the packet on interface queue 210B associated with virtual network interface 212B, the network interface of virtual machine 214B. As with device queues 204 and internal queues 209, there may be software locking mechanisms used to prevent more than one lcore from accessing an interface queue 210 at the same time.

Upon determining that an arriving network packet is to be processed in run-to-completion mode, virtual router 222 is configured to perform run-to-completion processing 232 of the network packet. In run-to-completion mode, virtual router 222 operates as described above with respect to FIG. 2B. In the example illustrated in FIG. 2C, physical network interface 202 receives a network packet with a destination of virtual machine 214C. Physical network interface 202 load balances or otherwise determines to insert the incoming packet onto device queue 204C, which has been assigned to lcore 208E. Lcore 208E determines that the network packet is available on its assigned device queue 204C and removes the network packet from device queue 204C. After processing the network packet, lcore 208E determines that the destination of the network packet is virtual machine 214C. Lcore 208E inserts the network packet onto interface queue 210C, which is the interface queue for virtual network interface 212C of virtual machine 214C. Thus, lcore 208E handles all processing of the network packet from when the packet is dequeued from a device queue to when the network packet is inserted onto an interface queue of a network interface of a destination device.

The virtual router 222 and server 220 has been simplified in the example shown in FIGS. 2A-2C in order to better explain the techniques of the disclosure. For example, the number of physical network interfaces 202, device queues 204, lcores 208, internal queues 209, interface queues 210, and virtual machines 214 illustrated in FIGS. 2A-2C may be different and may be greater than or less than the number of such components illustrated in FIGS. 2A-2C.

The examples illustrated in FIGS. 2A-2C have been discussed in the context of a network packet being received by physical network interface 202 and having a destination of a virtual machine 214. The same techniques can be applied to packets originating from a virtual machine 214 and having a destination via physical network interface 202. In this case, in the example illustrated in FIG. 2C, lcores 208C and 208D are polling lcores and lcores 208A and 208B are processing cores. In some aspects, virtual router 222 may perform hybrid processing by performing run-to-completion processing on packets originating from physical network interface 202 and performing pipeline processing on packets originating from a virtual machine 214. Alternatively, virtual router 222 may perform hybrid processing by performing pipeline processing on network packets received via physical network interface 202 and perform run-to-completion processing on network packets received from virtual network interface 212.

Figure 3:
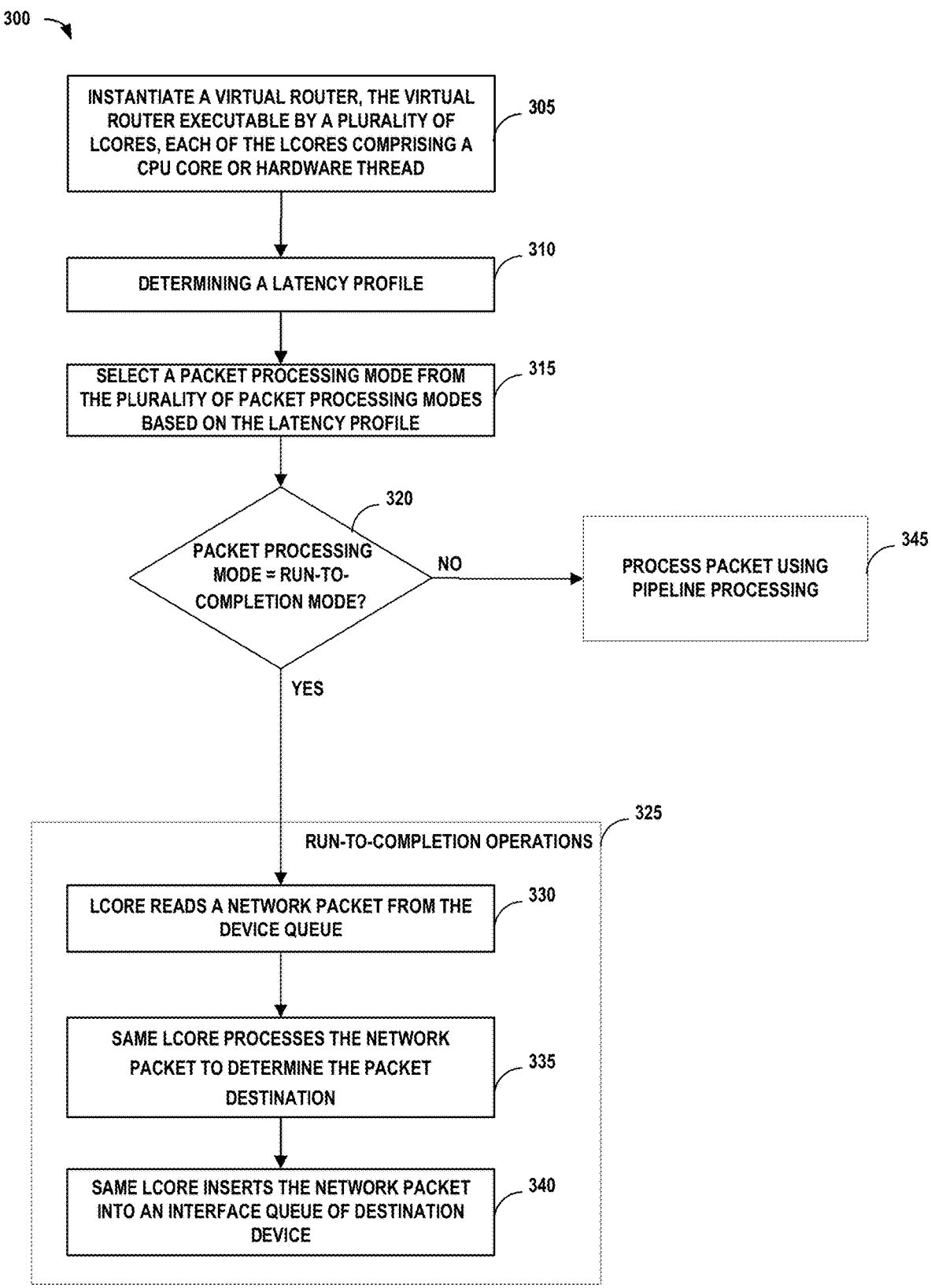
FIG. 3 is a flowchart illustrating operations of a method for selectively performing run-to-completion packet processing in accordance with techniques described herein.

FIG. 3 is a flowchart illustrating operations of a method for selectively performing run-to-completion packet processing in accordance with techniques described herein. A server may instantiate a virtual router, the virtual router executable by a plurality of lcores, each of the lcores assigned to a core processor of a plurality of core processors (305). Next, the virtual router may determine a latency profile based on characteristics of a physical network device, virtual network interface, or network protocol (310). Next, the virtual router may select a packet processing mode based on the latency profile (315). Next, the virtual router may determine if the packet processing mode is a run-to-completion mode (320). If the packet processing mode is the run-to-completion mode ("YES" branch of 320), the virtual router may process network packets using run-to-completion operations (325). The run-to completion operations may include an lcore reading a network packet from a device queue (330). The same lcore processes the network packet to determine a destination for the packet (e.g., a virtual device or VNIC of a virtual device) (335). Next, the same lcore inserts the network packet onto an interface queue of the destination device (340). If the packet processing mode is not the run-to-completion mode ("NO" branch of 320), the virtual router may process network packets using pipeline processing operations (345).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIGS. 1, 2, 3A, 3B and/or 4) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Further, one or more modules or components may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Also, one or more devices or components that may be illustrated in various Figures herein may alternatively be implemented as part of another device or component not shown in such Figures. In this and other ways, some of the functions described herein may be performed via distributed processing by two or more devices or components.

Each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A system comprising:
    a plurality of logical cores, each of the plurality of logical cores comprising a central processing unit (CPU) core or hardware thread;
    a physical network interface configured to receive network packets; and
    a virtual router executable by the plurality of logical cores, the virtual router implementing a plurality of packet processing modes, the packet processing modes including a run-to-completion mode, the virtual router configured to:
        in response to a determination that the virtual router is to operate in the run-to-completion mode, configure a logical core of the plurality of logical cores to:
            read a network packet received by the physical network interface,
            process the network packet to determine a destination virtual device for the network packet, the destination virtual device having a plurality of interface queues, and
            insert the network packet into an interface queue, of the plurality of interface queues, to which the logical core is assigned.

2. The system of claim 1, wherein in response to the determination that the virtual router is to operate in the run-to-completion mode, the virtual router assigns the interface queue to the logical core, wherein no other logical core of the plurality of logical cores is assigned to the interface queue.

3. The system of claim 1, wherein in response to the determination that the virtual router is to operate in the run-to-completion mode, the virtual router assigns, to the logical core, a device queue of a plurality of device queues of the physical network interface, wherein no other logical core of the plurality of logical cores is assigned to the device queue.

4. The system of claim 1, wherein the virtual router is configured to determine the virtual router is to operate in the run-to-completion mode based on a latency profile.

5. The system of claim 1, wherein to determine the virtual router is to operate in the run-to-completion mode, the virtual router is configured to determine that the physical network interface can load balance network packets across a plurality of device queues of the physical network interface.

6. The system of claim 5, wherein to determine that the physical network interface can load balance network packets across the plurality of device queues, the virtual router is configured to determine that the network packet received by the physical network interface conforms to a network protocol for which the physical network interface can load balance network packets across the plurality of device queues.

7. The system of claim 5, wherein to determine that the physical network interface can load balance network packets across the plurality of device queues, the virtual router is configured to determine that the physical network interface hashes the network packet received by the physical network interface, wherein packet header data of the network packet includes a protocol identifier.

8. The system of claim 5, wherein to determine that the physical network interface can load balance network packets across the plurality of device queues, the virtual router is configured to determine that the physical network interface is associated with a Dynamic Device Personalization (DDP) profile that indicates the physical network interface implements a filter that load balances across the plurality of device queues.

9. The system of claim 1, wherein the virtual router is configured to determine the virtual router is to operate in the run-to-completion mode in response to a determination that a virtual network interface card (VNIC) of the destination virtual device for the network packet is configured with the plurality of interface queues.

10. The system of claim 1, wherein the virtual router is configured to determine the virtual router is to operate in a pipeline mode in response to a determination that a VNIC of the destination virtual device for the network packet is configured with a single interface queue.

11. The system of claim 1, wherein the destination virtual device comprises a virtual machine.

12. A virtual router for a computing device, the virtual router having a plurality of packet processing modes, the packet processing modes including a run-to-completion mode, the virtual router comprising:
    a plurality of logical cores, each of the plurality of logical cores comprising a central processing unit (CPU) core or hardware thread of the computing device, the plurality of logical cores including a first logical core and a second logical core;
    wherein the first logical core is configured to:

in response to a determination that the virtual router is to operate in the run-to-completion mode, the second logical core is configured to:
  read a network packet from a physical network interface,
  process the network packet to determine a destination virtual device for the network packet, the destination virtual device having a plurality of interface queues, and
  insert the network packet into an interface queue of the plurality of interface queues.

13. The virtual router of claim 12, wherein in response to the determination that the virtual router is to operate in the run-to-completion mode, the first logical core is configured to:
  assign a device queue of the physical network interface to the second logical core, wherein no other logical core of the plurality of logical cores is assigned to the device queue; and
  assign the interface queue to the second logical core, wherein no other logical core of the plurality of logical cores is assigned to the interface queue.

14. The virtual router of claim 12, wherein the first logical core is configured to determine the virtual router is to operate in the run-to-completion mode in response to a determination that the physical network interface can load balance network packets across a plurality of device queues of the physical network interface.

15. The virtual router of claim 14, wherein the determination that the physical network interface can load balance network packets across the plurality of device queues comprises a determination that the network packet conforms to a network protocol that the physical network interface can load balance across the plurality of device queues.

16. The virtual router of claim 14, wherein the determination that the physical network interface can load balance network packets across the plurality of device queues comprises a determination that the physical network interface is associated with a Dynamic Device Personalization (DDP) profile that indicates the physical network interface implements a filter that load balances across the plurality of device queues.

17. A method comprising:
  instantiating a virtual router, the virtual router executable by a plurality of logical cores, each of the logical cores comprising a central processing unit (CPU) core or hardware thread, the plurality of lcores including a first logical core and a second logical core, the virtual router implementing a plurality of packet processing modes, the packet processing modes including a run-to-completion mode;
  determining, by the first logical core, a packet processing mode from a plurality of packet processing modes of the virtual router, the plurality of packet processing modes including a run-to-completion mode;
  in response to determining, by the first logical core, that the virtual router is to operate in the run-to-completion mode, configuring, by the first logical core, the second logical core to perform operations comprising:
    reading, by the second logical core, a network packet from a physical network interface,
    processing, by the second logical core, the network packet to determine a destination virtual device for the network packet, the destination virtual device having a plurality of interface queues, and
    inserting, by the second logical core, the network packet into an interface queue of the plurality of interface queues.

18. The method of claim 17, the method further comprising:
  in response to the determining that the virtual router is to operate in the run-to-completion mode:
    assigning a device queue of the physical network interface to the second logical core, wherein no other logical core of the plurality of logical cores is assigned to the device queue, and
    assigning the interface queue to the second logical core, wherein no other logical core of the plurality of logical cores is assigned to the interface queue.

19. The method of claim 17, wherein the determining that the virtual router is to operate in the run-to-completion mode is in response to determining that the physical network interface can load balance network packets across a plurality of device queues of the physical network interface.

20. The method of claim 19, wherein determining that the physical network interface can load balance network packets across the plurality of device queues comprises one or more of:
  determining that the network packet conforms to a network protocol that the physical network interface can load balance across the plurality of device queues;
  determining that the physical network interface is associated with a Dynamic Device Personalization (DDP) profile that indicates the physical network interface implements a filter that load balances across the plurality of device queues; or
  determining that a virtual network interface card (VNIC) of the destination virtual device is configured with the plurality of interface queues.

* * * * *